Patented Oct. 6, 1931

1,826,153

UNITED STATES PATENT OFFICE

JAMES A. SINGMASTER, OF BRONXVILLE, NEW YORK, AND HENRY SEYMOUR COLTON, OF WILMINGTON, DELAWARE, ASSIGNORS, BY MESNE ASSIGNMENTS, TO KREBS PIGMENT & COLOR CORPORATION, OF WILMINGTON, DELAWARE, A CORPORATION OF DELAWARE

LIGHT RESISTANT LITHOPONE

No Drawing. Application filed February 7, 1929. Serial No. 338,324.

This invention relates to lithopone, and has for its object the provision of certain improvements in the manufacture of lithopone, as well as the provision, as a new article of manufacture, of a new type of lithopone possessing a high degree of resistance to the discoloring action of the sun's rays.

Lithopone is a white pigment composed of zinc sulfide and barium sulfate and is extensively used in the paint industry. In manufacturing lithopone, solutions of barium sulfide and zinc sulfate are appropriately mixed and the resulting precipitate of zinc sulfide and barium sulfate is filtered, washed, and dried. This precipitate is generally referred to as crude lithopone. This crude lithopone has a low degree of brightness, is far from perfect white in color, is hard and gritty, possesses low strength or hiding power, and has an extremely high oil absorption. It has one merit, however, in that, unlike finished lithopone, it is not discolored by sunlight. In order to produce a pigment from crude lithopone, it is necessary to calcine the product at a low red heat (about 700-800° C.) and to cool it suddenly as, for example, by plunging it in cold water. Subsequently the quenched product is wet-milled, filtered, and dried, to produce the ordinary lithopone of commerce.

Lithopone manufactured a few years ago showed a tendency to turn gray or to otherwise discolor under the action of the sun's rays, the extent of discoloration depending to some extent on the quality of the pigment. The color sometimes gradually disappeared when the painted surface was shielded from light, but it appeared again on re-exposure. This fault of lithopone impeded the progress of its exploitation for years and almost inhibited the use of this valuable pigment in paints intended for outdoor exposure.

Under the circumstances described it is only natural that a great deal of research effort was expended in attempting to determine the causes of discoloration, and to find a cure for the trouble. The prior art is full of patented suggestions for the production of light-resistant lithopone and in addition to these specific disclosures, it should be noted that many other patents directed primarily at the improvement of other properties of lithopone contain statements to the effect that the light resistance of the lithopone is improved by the practises described. No detailed digest of the literature on light-resistant lithopone prior to 1922 need be given here since James E. Booge's U. S. Patent 1,657,195 of January 24, 1928, contains a fairly complete summary of the art up to April, 1922, (see page 1, line 85 to page 4, line 83 of the Booge patent).

It is true no doubt that some of the practises described in the prior art produced lithopones that were undisputably superior in light resistance when compared to an appropriate standard of comparison, that is, an ordinary lithopone produced prior to the time of the development in question. It should be noted, further, that careful attention to the purity of materials and the details of manufacture have greatly raised the general quality of lithopone manufactured through the years and this improved quality has shown itself in an elevated degree of resistance to discoloration as well as in other properties. Nevertheless, it may be fairly stated that most of the various attempts to produce a truly light resistant lithopone prior to 1922, together with much of the published data since that date, may be briefly dismissed as ineffective if not inoperative. The proof of this statement is simple for it is a fact known to those in the art that the industry had not succeeded in producing a lithopone of desirable paint-making properties that was truly resistant to discoloration by the sun's rays until about that time. While the prior art contains all sorts of suggestions concerning the addition of special reagents to the lithopone to produce a light-resistant product, none of these proposals is actually fully effective as applied to modern lithopone manufacture. Some ingredients, such as magnesia are known to have a favorable effect on light resistance, but materials of this sort must be added in proportions so large as to constitute an adulteration, and the result is imperfect nevertheless. Other reagents have been proposed which undoubtedly serve to improve the light resistance but which impart other and undesirable properties to the lithopone; such, for example, as poor color, diminished hiding power, increased particle size, grittiness, poor oil absorption, etc.

The fact that light resistant lithopone could be manufactured from zinc liquor substantially free from water soluble salts, particularly chlorides, was also well known in the art but this plan has never been of much value because of the prohibitive cost of materials and because the oil absorption of the product, when it is calcined at a sufficiently high temperature to produce the necessary hiding power, is too high for the majority of paint uses.

In 1922, F. G. Breyer et al (U. S. Patent 1,411,645) reported the discovery that a light resistant lithopone suitable for paint-making uses might be manufactured from liquors containing water-soluble salts, particularly chlorides, by careful adjustment of the chlorine content and the muffling temperature. The presence of chlorine in the raw lithopone undergoing calcination was found to produce desirable hiding power and oil absorption at muffling temperatures considerably less than those required for the treatment of chlorine-free material, and it was found that a control of the amount of chlorine permitted the production of light resistant lithopone without sacrificing the valuable effect obtained by the presence of chlorine during calcination.

In 1926 Jantsch and Wolski (German Patent 435,840) reported that the addition of from 0.02 to 0.5 parts per thousand of cobalt produced an improved light resistance in lithopone.

We have now discovered a method whereby a lithopone of excellent light resistance and satisfactory paint-making properties may be produced from liquors of widely varying chlorine content, the improvement thus attained being independent of precise muffling conditions or temperatures. This method comprises the addition, to the lithopone or to the solutions used for precipitating the lithopone, of a small quantity of a vanadium compound or of a compound of a metal of the sixth group of the periodic table, excluding molybdenum. These sixth group metals include chromium, tungsten, and uranium. While vanadium is a member of the fifth group of the periodic table it is as good as a sixth group metal for our purpose. This may be due to its chemical similarity to tungsten, or to some other obscure chemical property of which we are not aware, but since its properties are similar to those of tungsten in the present invention, we group it with metals of the sixth group and refer to them in the specification and claims as elements of the vanadium, chromium, tungsten, and uranium group.

We prefer to add the metal in the form of a soluble salt, and to make this addition to the zinc liquor prior to the precipitation of the lithopone, or to the freshly precipitated crude lithopone; but our invention is not thus limited, since the treatment of previously-calcined lithopone with a solution of a salt of one of the metals produces the same result, though somewhat less efficiently. We have found that the improved light resistance is due to the metal itself and is not dependent on the particular valence or compound in which the metal is present. For example, chromium is effective for this purpose in the chromate form as well as in the form of chromous or chromic salt. Similarly vanadium is effective when added as a vanadate, as well as in the form of a vanadium salt.

The invention is not limited to the use of any precise proportion of metallic compound. We have obtained good results with as little as 1.5 milligrams of metal per 100 grams of crude lithopone and similar good results are usually obtained with as much as 50 milligrams. The maximum amount that may be added depends to some extent on the particular metal, since an excess of metallic compound tends to discolor the lithopone. In general, we have obtained the best results by the use of 2–5 milligrams of metal per 100 grams of crude lithopone.

Our invention is in no way limited to the treatment of lithopones produced from solutions having any fixed content of water-soluble salts, particularly chlorides. Lithopone produced from high-chlorine liquor is notably deficient in light resistance and it is with this type of material that the practice of our invention produces the greatest quantitative improvement. While lithopone produced from chlorine-free liquor is usually fairly good in light resistance, the application of our invention to this type of material produces an improvement in that property. The greatest practical application of our invention at the present time is in the case of the modern lithopones procured from liquors containing 1–3 grams of chlorine per liter of 40° Bé. solution. Such lithopones are produced by calcination at about 740–820° and exhibit a minimum hiding power of about 55 sq. cm./gram measured on the Pfund Cryptometer. While the light resistance of lithopones of this type is far superior to that obtained in the case of lithopones manufactured prior to the development of the so-called "Chlorine control", the use of our invention permits the production of a pigment of greatly enhanced light resistance.

Before proceeding further, it should be realized that a discussion of the degree of light resistance of a lithopone is almost necessarily based on empirical tests. Most of the reported tests depend on the use of a so-called "standard lithopone sample" as a basis for comparison. The degree of light resistance of the sample of the improved product is therefore merely proportionate to that resistance displayed by ordinary lithopone under the same test conditions. Since the quality of ordinary lithopone has been greatly improved through the years, the standard of light resistance has also been raised proportionately, and samples of lithopone which were considered fairly light-resistant some years ago would today be regarded as deficient in that respect.

Unquestionably the best test of the light resistance of lithopone is made by incorporating the pigment in an actual paint, submitting a film of the paint to out-door exposure, and observing the result. Such a test necessarily occupies several months and hence is not suitable for ordinary laboratory use. For this reason, an accelerated testing method involving the use of strong ultra-violet rays is employed. This method of testing is as follows:

Several grams of the sample to be tested are rubbed up to a stiff paste in a vehicle of dammar gum and turpentine. The proportion of dammar and turpentine is so adjusted that the solution is the consistency of a thick varnish. Linseed oil or water may be used to replace the dammar solution. The sample thus prepared, is spread on a zinc strip in a daub about 1" wide and 2" long and standards of comparison comprising several different lithopones of varying known light resistance, similarly prepared, are spread on the same strip. The daubs are then dried by heating the strip in an oven, or in some other convenient manner.

An opaque plate is then placed on the zinc strip so that one half of each daub is covered and the whole is then placed in a tray under about ¼" of water and is submitted to the ultra-violet light emanating from a Cooper Hewitt arc lamp, or other suitable source of ultra-violet rays, for five or ten minutes. The time of exposure is regulated so that the poorest standard darkens materially, while the best standard is not visibly affected. The standards for comparison are selected so that one darkens very badly, another is nearly perfect, and does not darken, and the third standard shows a degree of discoloration about half way between the other two. The results of the test are then interpolated, using the standard samples as limits.

While the test is ordinarily made on lithopone daubs prepared with dammar solution, the tests obtained with linseed oil daubs are generally concordant. Tests made on daubs prepared with water are more rapid in completion, but the results are not so closely comparable to true conditions encountered in the outdoor exposure of paints.

In placing a numerical value on the results obtained, a sample which darkens almost instantaneously and turns dark grey or black in color is given the value "$-10$". A sample which is not at all discolored by the test is given the value "$+10$". Zero on this scale is near the dividing line between light-resistant and non-light-resistant lithopone. The third or intermedite standard sample is graded as "0", and the sample under test is evaluated according to the scale indicated. A lithopone whose index of light resistance is on the plus side of zero does not usually darken at all under ordinary conditions of outside exposure in a paint film and hence may be properly referred to as "light resistant."

Now having generally described our invention, we shall illustrate it by a number of examples. It will be understood that the factors of light resistance reported in the examples are factors of comparison, by the test above described, of the improved lithopone of our invention with lithopone, manufactured from the same raw materials and in the same manner, to which no light resisting metal has been added.

Vanadium

When small quantities of a vanadium compound are introduced into the solutions from which lithopone is precipitated, or are incorporated with crude precipitated lithopone, the resulting pigment is highly light resistant, averaging about "plus nine" in the light resistance tests.

For example, an amount of vanadium chloride ($VCl_4$) equivalent to about 5 milligrams of metal per 100 grams of raw lithopone, when added to zinc liquor containing about one gram of chlorine per liter of 40° Bé. solution, does not discolor the final calcined product and the light resistance is raised from about zero or plus one to plus nine. The addition of five times the quantity mentioned produces substantially the same result.

It will be realized, of course, that the precise measure of improvement depends on the calcination temperature of the lithopone. For example, the light resistance of lithopone calcined at 740° is generally better than the light resistance of the same material when calcined at a higher temperature—e. g., about 780–800°. The higher temperature is used, nevertheless, to produce the desired hiding power in the product. The exact factor of improvement therefore varies with the calcination temperature and it varies, also, with the method of test, since the testing of daubs prepared with water usually gives higher results than those obtained in the case of daubs prepared with dammar solution or with linseed oil.

Other compounds of vanadium may be employed in place of the chloride. For example, equivalent proportions of ammonium metavanadate, vanadium sulfate or other salts produce the same result.

Similar results are also obtained when zinc liquors containing as much as 3 grams of chlorine per liter of 40° Bé. solution are used. As the chlorine content of the lithopone increases, the addition of vanadium is even more benefical in view of the lowered light resistance of the usual product.

The impregnation of calcined lithopone with a salt of vanadium also serves to increase the light resistance of the product. For example, the addition of about two milligrams of vanadium, in the form of vanadium tetrachloride, to the water used to quench 100 grams of lithopone caused an improvement in light resistance of from minus 4 for the blank sample to plus nine for the treated sample. This improvement was observed in the tests in which the daubs were prepared with water. The improvement is much less noticeable, and is some times hardly perceptible, when the tests are made in dammar solution or in linseed oil.

Tungsten

Tungsten is generally similar to vanadium in its property of imparting light resistance to lithopone. For example, an amount of sodium tungstate ($Na_2WO_4$) equivalent to about 2 milligrams of tungsten per 100 grams of raw lithopone, when added to zinc liquor containing about 1 gram of chlorine per liter of 40° Bé. solution, produces a lithopone having an average light resistance of about plus six to plus nine as compared with the ordinary product whose light resistance averages plus zero to plus one. Other compounds of tungsten, such as potassium tungstate or ammonium tungstate produce the same result. In place of a soluble salt, insoluble tungstic oxide may be suspended in the zinc liquor or incorporated with the raw lithopone, and the same improved result obtained. Larger quantities of tungsten may be employed if desired, the upper quantitative limit depending on the tendency of the tungsten to discolor the lithopone.

Tungsten may be used in the quenching water as in the case of vanadium. For example, the use of about two milligrams of tungsten, as sodium tungstate, in the water used to quench 100 grams of calcined lithopone caused an improvement (in the case of the water daub test) of from minus four in the case of the blank sample to plus four in the case of the treated sample.

In all other respects the phenomena observed in the case of tungsten were generally similar to those in the case of vanadium, except for the fact that tungsten is generally not quite so efficient.

Chromium

Chromium is almost as efficient as vanadium in imparting light resistance to lithopone. For example, as little as 1.5 milligrams of chromium, in the form of chromous chloride ($CrCl_2$) raises the light resistance of lithopone from an average of zero or plus one to six or nine. Chromic chloride ($Cr_2Cl_6$) may be substituted for chromous chloride. The result obtained when about 40 milligrams of metal are used is not greatly different. A substantial increase over this amount sometimes imparts a greenish tinge to the calcined lithopone. Equivalent quantities of chromate salts, such as potassium chromate or magnesium chromate operate in the same way. Chromic oxide itself may be used, if desired.

Uranium

Uranium has an effect similar to that produced by vanadium, tungsten, and chromium. For example, an amount of uranium (as uranium nitrate or uranium acid phosphate) equivalent to 5 milligrams of metal per 100 grams of crude lithopone raises the light resistance of lithopone about six points on the arbitrary scale hereinbefore described. Other compounds of uranium may be used in place of those described and the effects obtained are similar to those described in the case of vanadium.

Now, having described our invention, we claim:—

1. A process for improving the light resistance of lithopone which comprises incorporating therewith a compound of vanadium.

2. A process for improving the light resistance of lithopone which comprises incorporating a compound of vanadium therewith prior to calcination.

3. Lithopone resistant to light and containing a compound of an element of the group consisting of vanadium, chromium, tungsten and uranium.

4. Lithopone resistant to light, having a hiding power of not less than 55 sq. cm./gram measured on the Pfund Cryptometer and containing a compound of an element of the group consisting of vanadium, chromium, tungsten and uranium.

5. Lithopone produced from zinc liquor containing 1–3 grams of chlorine per liter of 40° Bé. solution, and containing a compound of an element of the group consisting of vanadium, chromium, tungsten and uranium.

6. Lithopone produced from zinc liquor containing 1–3 grams of chlorine per liter of 40° Bé. solution, having a hiding power of not less than 55 sq. cm./gram measured on the Pfund Cryptometer, and containing a compound of an element of the group consisting of vanadium, chromium, tungsten and uranium.

7. Lithopone resistant to light and containing a compound of an element of the group consisting of vanadium, chromium, tungsten and uranium, said compound being present in an amount corresponding to about 2-5 milligrams of the element in 100 grams of lithopone.

8. Lithopone resistant to light, having a hiding power of not less than 55 sq. cm./gram measured on the Pfund Cryptometer, and containing a compound of an element of the group consisting of vanadium, chromium, tungsten and uranium, said compound being present in an amount corresponding to about 2-5 milligrams of the element in 100 grams of the lithopone.

9. A lithopone produced from zinc liquor containing 1-3 grams of chlorine per liter of 40° Bé. solution and containing a compound of an element of the group consisting of vanadium, chromium, tungsten and uranium, said compound being present in an amount corresponding to about 2-5 milligrams of the element in 100 grams of lithopone.

10. Lithopone produced from zinc liquor containing 1-3 grams of chlorine per liter of 40° Bé. solution, having a hiding power of not less than 55 sq. cm./gram measured on the Pfund Cryptometer, and containing a compound of an element of the group consisting of vanadium, chromium, tungsten and uranium, said compound being present in an amount corresponding to about 2-5 milligrams of the element in 100 grams of lithopone.

11. Lithopone resistant to light and containing a compound of vanadium.

12. Lithopone resistant to light, having a hiding power of not less than 50 sq. cm./gram measured on the Pfund Cryptometer, and containing a vanadium compound in an amount corresponding to about 2-5 milligrams of vanadium in 100 grams of lithopone.

13. Lithopone produced from zinc liquor containing 1-3 grams of chlorine per liter of 40° Bé. solution and containing a vanadium compound in an amount corresponding to about 2-5 milligrams of vanadium per 100 grams of lithopone.

14. The process of improving the light resistance of lithopone which comprises incorporating into lithopone a compound of an element of the group comprising vanadium, chromium, tungsten and uranium.

15. The process of improving the light resistance of lithopone which comprises incorporating into lithopone, prior to calcination, a compound of an element of the group consisting of vanadium, chromium, tungsten and uranium.

16. The process of improving the light resistance of lithopone which comprises incorporating into lithopone, prior to calcination, a compound of an element of the group consisting of vanadium, chromium, tungsten and uranium, said compound being present in an amount corresponding to about 2-5 milligrams of the element in 100 grams lithopone.

17. The process of improving the light resistance of lithopone which comprises incorporating into lithopone an amount of a vanadium compound corresponding to about 2-5 milligrams of vanadium per 100 grams of lithopone.

18. The process of improving the light resistance of lithopone which comprises incorporating into lithopone, prior to calcination, an amount of a vanadium compound corresponding to about 2-5 milligrams of vanadium per 100 grams of lithopone.

In testimony whereof, we have signed our names to this specification, February 1929, on the dates hereinafter set forth.

JAMES A. SINGMASTER.
HENRY SEYMOUR COLTON.